US012645891B2

(12) United States Patent
Han et al.

(10) Patent No.: US 12,645,891 B2
(45) Date of Patent: Jun. 2, 2026

(54) AI-BASED EMAIL GENERATOR

(71) Applicant: 6SENSE INSIGHTS, INC., San Francisco, CA (US)

(72) Inventors: Gabriel Lim Yong Han, Singapore (SG); Ethan Le Duc Toan, Singapore (SG); Nguyen Thanh Thu, Singapore (SG); Lim Ken Jyi, Singapore (SG); Amir bin Abu Hasan, Singapore (SG); Max Lorenz, Singapore (SG)

(73) Assignee: 6SENSE INSIGHTS, INC., San Francisco, CA (US)

( * ) Notice: Subject to any disclaimer, the term of this patent is extended or adjusted under 35 U.S.C. 154(b) by 276 days.

(21) Appl. No.: 18/465,509

(22) Filed: Sep. 12, 2023

(65) Prior Publication Data

US 2024/0086648 A1 Mar. 14, 2024

Related U.S. Application Data

(60) Provisional application No. 63/406,008, filed on Sep. 13, 2022.

(51) Int. Cl.
*G06F 40/40* (2020.01)
*G06F 3/0482* (2013.01)
(Continued)

(52) U.S. Cl.
CPC ............ *G06F 40/40* (2020.01); *G06F 3/0482* (2013.01); *G06F 3/04847* (2013.01);
(Continued)

(58) Field of Classification Search
CPC ... G10L 19/00; G10L 19/0204; G10L 19/008; G06F 40/00; G06F 40/40; G06F 40/35;
(Continued)

(56) References Cited

U.S. PATENT DOCUMENTS 11,158,311 B1 10/2021 Zhang
11,516,158 B1 * 11/2022 Luzhnica ................ G06F 40/35
(Continued)

OTHER PUBLICATIONS

Reynolds, L. and McDonell, K., May 2021. Prompt programming for large language models: Beyond the few-shot paradigm. In Extended abstracts of the 2021 CHI conference on human factors in computing systems (pp. 1-7). (Year: 2021).*
(Continued)

*Primary Examiner* — Sean E Serraguard
(74) *Attorney, Agent, or Firm* — Procopio, Cory, Hargreaves & Savitch LLP

(57) ABSTRACT

Historically, email sequences for sales and marketing must be generated manually, which is a time-intensive and labor-intensive process. Accordingly, disclosed embodiments use machine learning to automatedly generate personalized, relevant, and/or performant email sequences, at scale. In particular, an email sequence may be generated by, for each email message in an email sequence and for each content block in the email message, generate a prompt based on one or more parameter values, input the prompt to a generative language model to produce the content block, and add the content block to the email message. In an embodiment, a user may easily regenerate the entire email sequence or regenerate individual content blocks within the email sequence.

25 Claims, 7 Drawing Sheets

(51) Int. Cl.

| | |
|---|---|
| *G06F 3/04847* | (2022.01) |
| *G06F 16/95* | (2019.01) |
| *G06F 40/166* | (2020.01) |
| *G06F 40/279* | (2020.01) |
| *G06F 40/35* | (2020.01) |
| *G06N 3/08* | (2023.01) |

(52) U.S. Cl.
CPC .......... *G06F 40/166* (2020.01); *G06F 40/279* (2020.01); *G06F 40/35* (2020.01); *G06N 3/08* (2013.01); *G06F 16/95* (2019.01)

(58) Field of Classification Search
CPC ........ G06F 40/279; G06F 40/166; G06F 3/00; G06F 3/0482; G06F 3/04847; G06F 16/00; G06F 16/95; G06N 3/00; G06N 3/08
See application file for complete search history.

(56) References Cited

U.S. PATENT DOCUMENTS

| | | | | |
|---|---|---|---|---|
| 2005/0213743 | A1* | 9/2005 | Huet | H04M 3/5191 |
| | | | | 379/265.09 |
| 2014/0337266 | A1 | 11/2014 | Kalns et al. | |
| 2020/0065857 | A1* | 2/2020 | Lagi | G06Q 30/0254 |
| 2020/0143247 | A1* | 5/2020 | Jonnalagadda | G06N 3/044 |
| 2020/0380301 | A1 | 12/2020 | Siracusa et al. | |
| 2020/0394366 | A1* | 12/2020 | Miller | G06F 40/35 |
| 2021/0406685 | A1 | 12/2021 | Carmody et al. | |
| 2022/0006761 | A1 | 1/2022 | Magliozzi et al. | |
| 2023/0350928 | A1* | 11/2023 | Hill | G06F 40/284 |

OTHER PUBLICATIONS

International Search Report dated Jan. 23, 2024 in PCT/US23/32547.

* cited by examiner

200

Processor 210

Main Memory 215

I/O Interface 235

Communication Interface 240

Baseband 260

Radio 265

Antenna 270

Secondary Memory 220

Internal Medium 225

Removable Medium 230

External System 245

255

250

Communication Bus 205

<u>300</u>

<u>400</u>

500

600

600

AI-BASED EMAIL GENERATOR

CROSS-REFERENCE TO RELATED APPLICATIONS

This application claims priority to U.S. Provisional Patent App. No. 63/406,008, filed on Sep. 13, 2022, which is hereby incorporated herein by reference as if set forth in full.

BACKGROUND

Field of the Invention

The embodiments described herein are generally directed to artificial intelligence (AI), and, more particularly, to automated generation of email sequences using an AI model, such as a generative language model.

Description of the Related Art

Historically, emails sequences for sales and marketing have been generated manually. However, building effective sequences of conversational emails is both time-intensive and labor-intensive. For instance, a single generic email sequence (e.g., applicable to multiple contacts), having a coherent underlying theme, may take thirty to sixty minutes to create. The creation of specific email sequences (e.g., applicable to a single specific contact) results in a combinatorial explosion in time and labor, since each email sequence must account for different personas, verticals, themes, solutions, and/or the like. As a result, business development representatives spend most of their working hours building personalized email sequences.

SUMMARY

Accordingly, systems, methods, and non-transitory computer-readable media are disclosed for generating personalized, relevant, and/or performant email sequences, at scale, using machine-learning.

In an embodiment, a method comprises using at least one hardware processor to: receive one or more parameter values for one or more parameters; generate an email sequence by, for each of one or more email messages in the email sequence, for each of one or more content blocks in the email message, generating a prompt based on the one or more parameter values, inputting the prompt to a generative language model to produce the content block, and adding the content block to the email message; and output the generated email sequence. The one or more email messages may be a plurality of email messages. The email sequence may comprise a first email message and one or more follow-up email messages.

The method may further comprise training the generative language model by fine-tuning a pretrained generative language model. The fine-tuning may be performed using a training dataset that is derived from email conversations that have been classified according to outcome.

Each of the one or more content blocks may be associated with one of a plurality of categories of content blocks. The plurality of categories may comprise one or more of a subject line, an illumination question, an agitation question, a main value proposition, a supporting value proposition, a succinct description, or a call to action. For each of the one or more content blocks, the prompt may comprise: one or more examples, wherein each of the one or more examples comprises an output in association with an example value for at least one prompt parameter; and a prompt to provide the output based on a value, for the at least one prompt parameter, that is specific to the content block. The at least one prompt parameter may comprise one or more of a company or product name, a set of one or more keywords, a company or product description, or a target audience. The at least one prompt parameter may comprise a set of one or more keywords that are derived from the one or more parameter values.

The method may further comprise using the at least one hardware processor to generate a graphical user interface comprising one or more inputs, wherein receiving the one or more parameter values comprises receiving an input of the one or more parameter values via the one or more inputs of the graphical user interface. The one or more inputs may be a plurality of inputs, and the method may further comprise using the at least one hardware processor to receive a selection of one of the plurality of inputs, wherein the email sequence is generated in response to the selection of the one input. Outputting the generated email sequence may comprise updating the graphical user interface to display the generated email sequence. Each of the one or more content blocks in the displayed email sequence may be selectable, and the method may further comprise using the at least one hardware processor to: when receiving a selection of one of the one or more content blocks in the displayed email sequence, display an input for regenerating the selected content block; and in response to a selection of the input for regenerating the selected content block, re-input the prompt, generated for the selected content block, to the generative language model to produce one or more new suggestions for the selected content block. Each of the one or more new suggestions for the selected content block may be selectable, and the method may further comprise using the at least one hardware processor to, in response to a selection of one of the one or more new suggestions, replace textual content in the selected content block in the displayed email sequence with the textual content in the selected new suggestion.

The method may further comprise using the at least one hardware processor to: receive an update to at least one of the one or more parameter values; regenerate the email sequence by, for each of the one or more email messages in the email sequence, for each of the one or more content blocks in the email message, generate the prompt based on the one or more parameter values including the updated at least one parameter value, input the prompt to the generative language model to produce the content block, and add the content block to the email message; and output the regenerated email sequence.

The one or more parameters may comprise one or more of a goal of the email sequence, a target audience for the email sequence, a theme of the email sequence, a name of a company or product, or a description of the company or product. The method may further comprise using the at least one hardware processor to: save the generated email sequence in memory; associate a plurality of contacts with the saved email sequence; and initiate an email campaign by merging contact information, associated with the plurality of contacts, with a first email message in the email sequence to generate a plurality of contact-specific email messages to the plurality of contacts, and send each of the plurality of contact-specific email messages to a respective one of the plurality of contacts.

In an embodiment, a method comprises using at least one hardware processor to: receive an email message; apply a plurality of intent classification models to the email message, wherein each of the plurality of intent classification models outputs an intent classification of the email message and a confidence value; when the intent classifications, output by the plurality of intent classification models, match each other, and a confidence, represented by the confidence values output by the plurality of classification models, satisfies a threshold, generate a reply email message by, determining one or more content blocks based on the matching intent classifications, for each of the one or more content blocks, generating a prompt based on one or more parameter values, inputting the prompt to a generative language model to produce the content block, and adding the content block to the reply email message, and outputting the reply email message; and, when the intent classifications do not match each other or the confidence does not satisfy the threshold, notify a user.

The plurality of intent classification models may comprise different types of models. The plurality of intent classification models may comprise one or both of a light gradient boosting machine (LightGBM) classifier, or a bidirectional encoder representations from transformers (BERT)-based classifier. Outputting the reply email message may comprise automatically sending the reply email message without human intervention. Generating the reply email message may further comprise, when the intent classifications indicate that a sender of the email message desires a meeting with an agent, adding an email address of the agent to the reply email message. Generating the reply email message may further comprise, when the intents indicate that a sender of the email message desires information about a product, adding a document, containing information about the product, or a reference to information about the product to the reply email message.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

4

Figure 5:
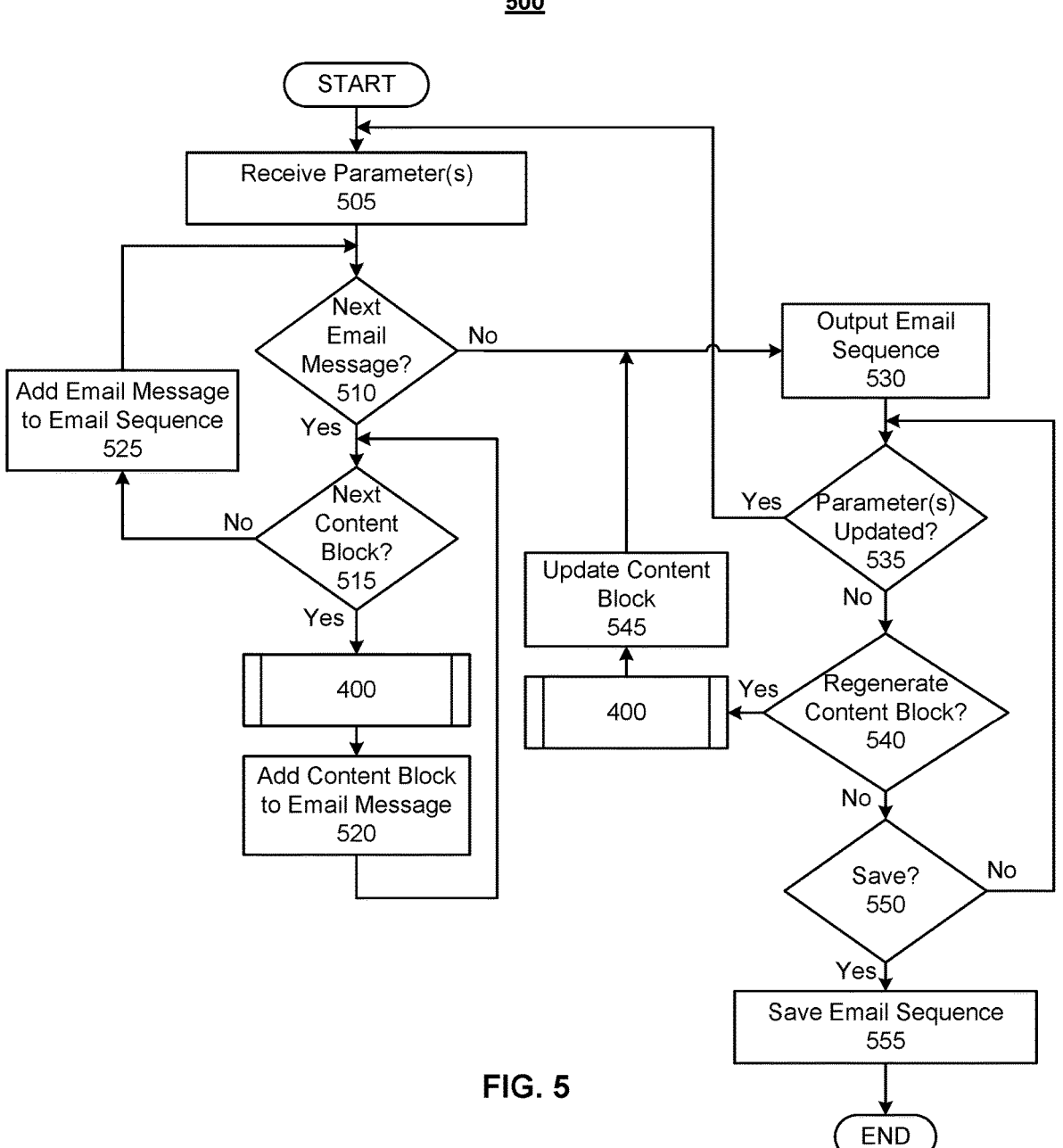
Figure 6A:
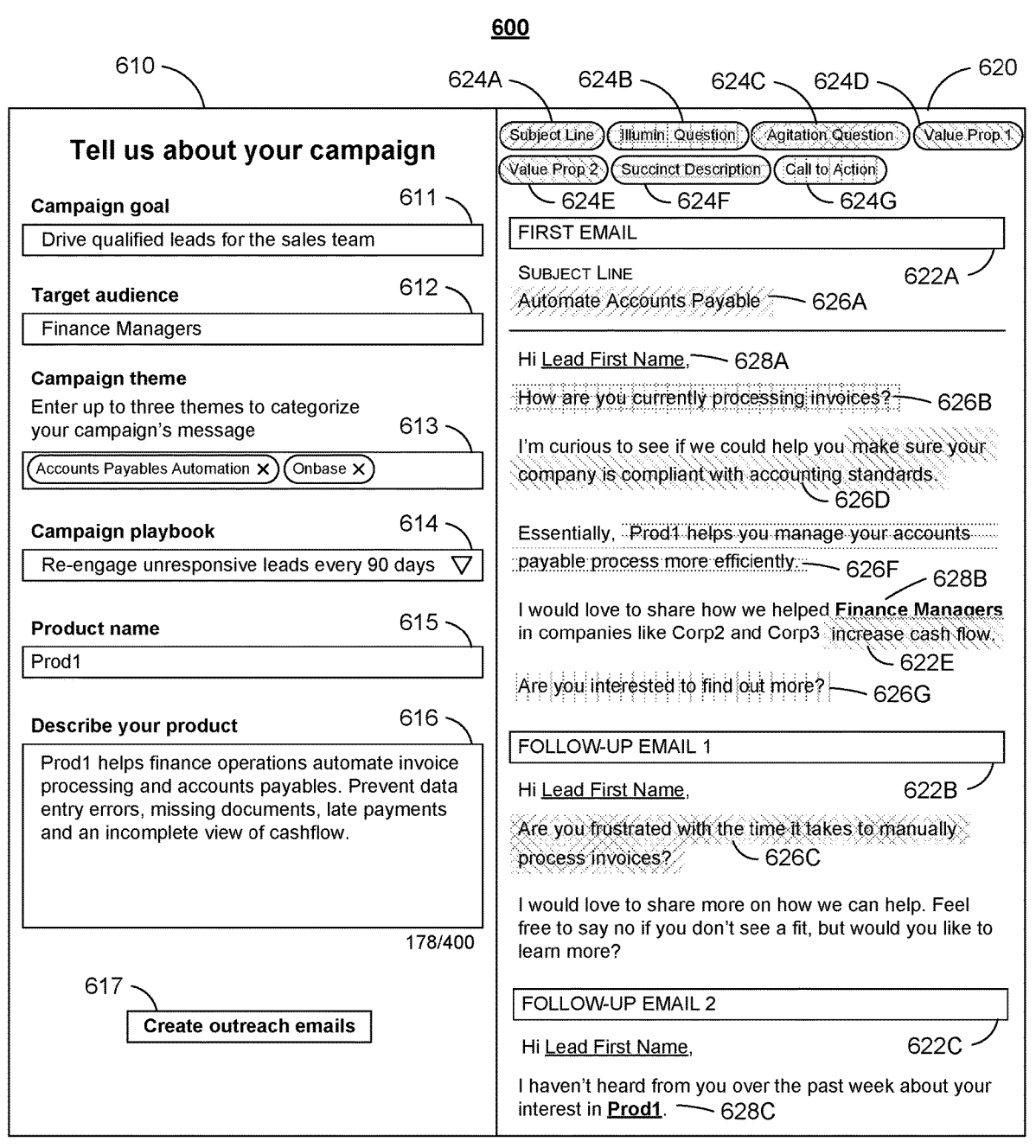
Figure 6B:
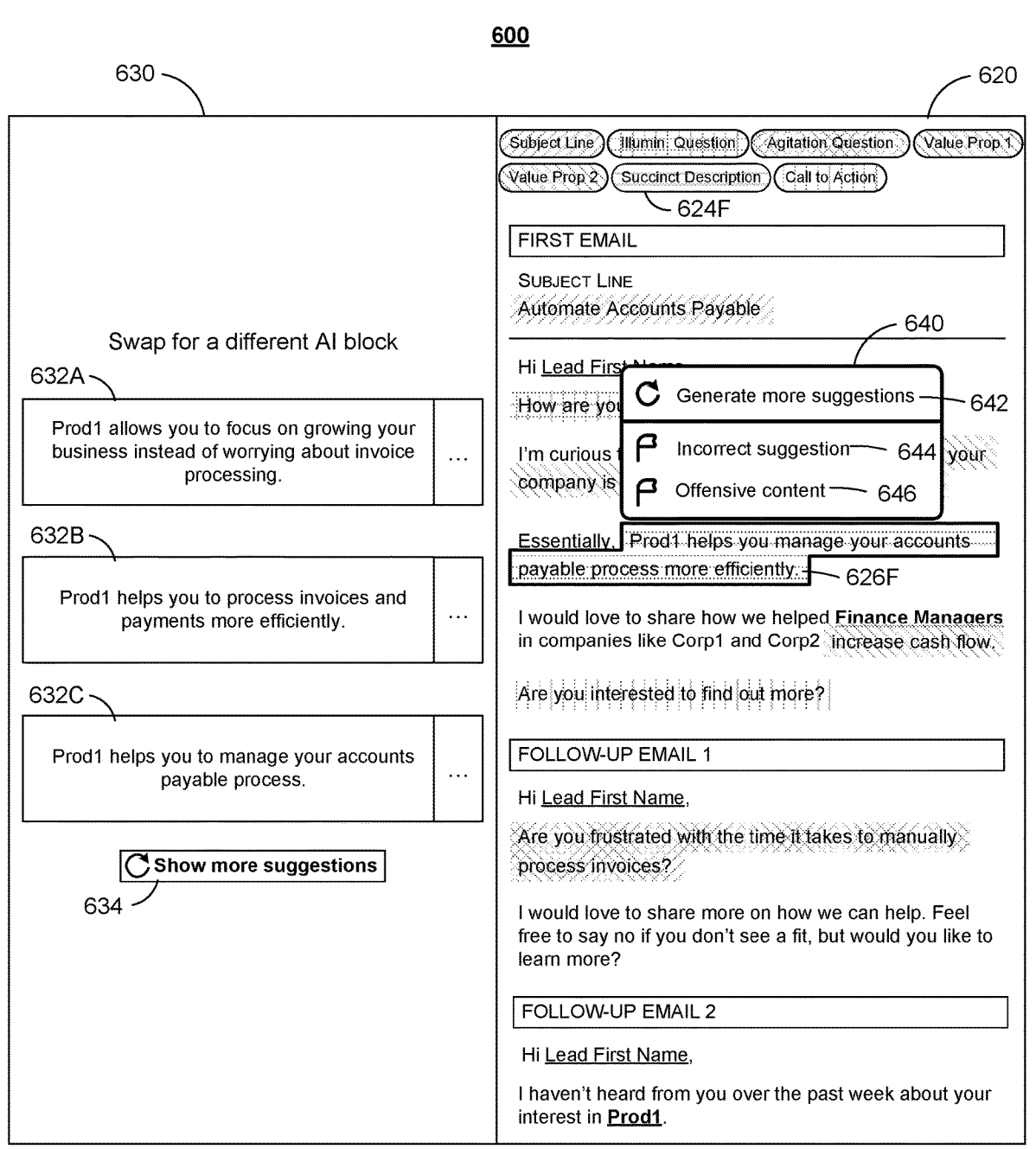
Figure 7:
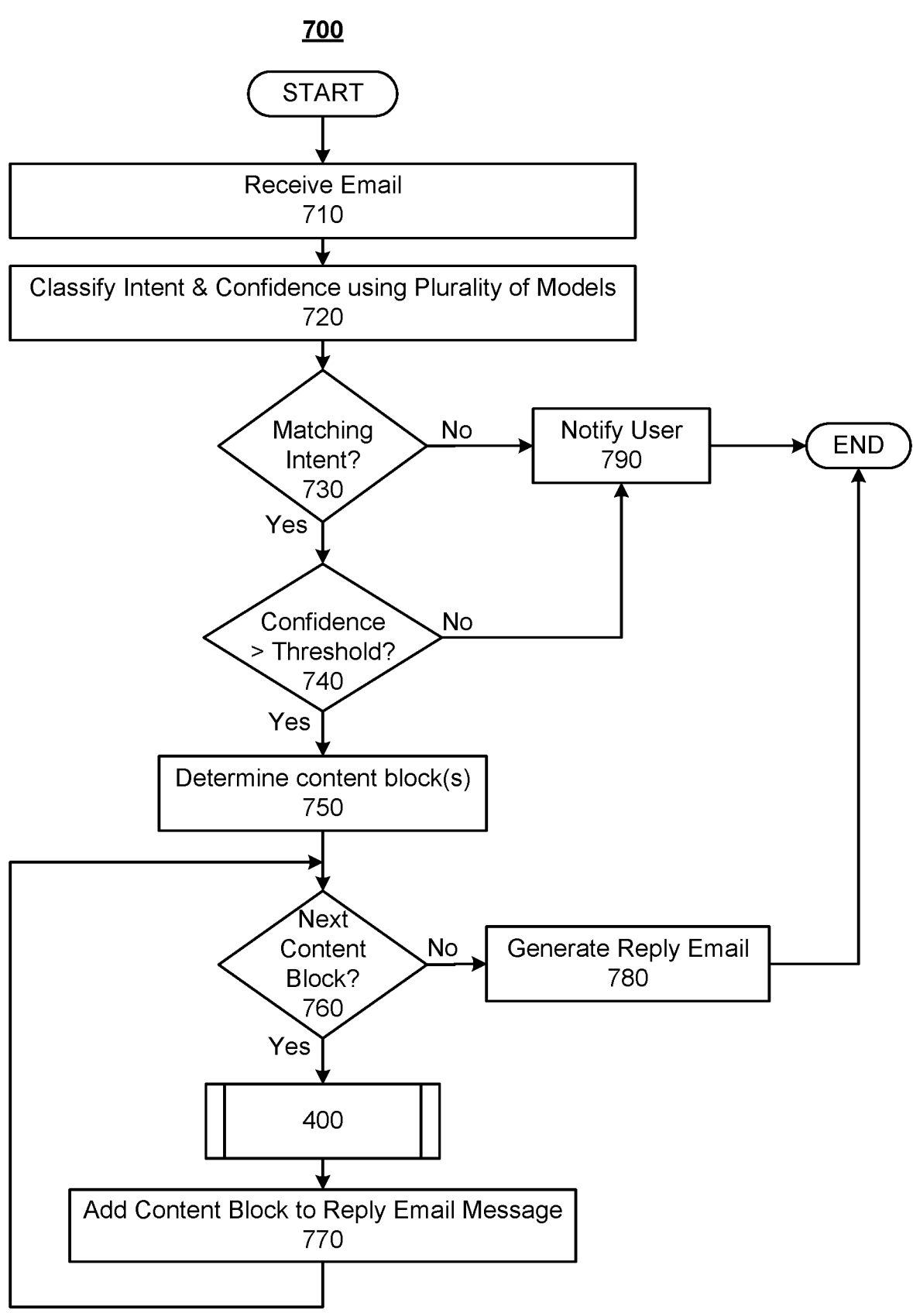

FIG. 5 illustrates a process for generating an email sequence using a machine-learning model, according to an embodiment; and FIGS. 6A and 6B illustrate an example of a graphical user interface that can be used to generate email sequences, according to an embodiment; and FIG. 7 illustrates a process for generating an email reply using a machine-learning model, according to an embodiment.

DETAILED DESCRIPTION

In an embodiment, systems, methods, and non-transitory computer-readable media are disclosed for generating personalized, relevant, and/or performant emails sequences, at scale, using machine-learning. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
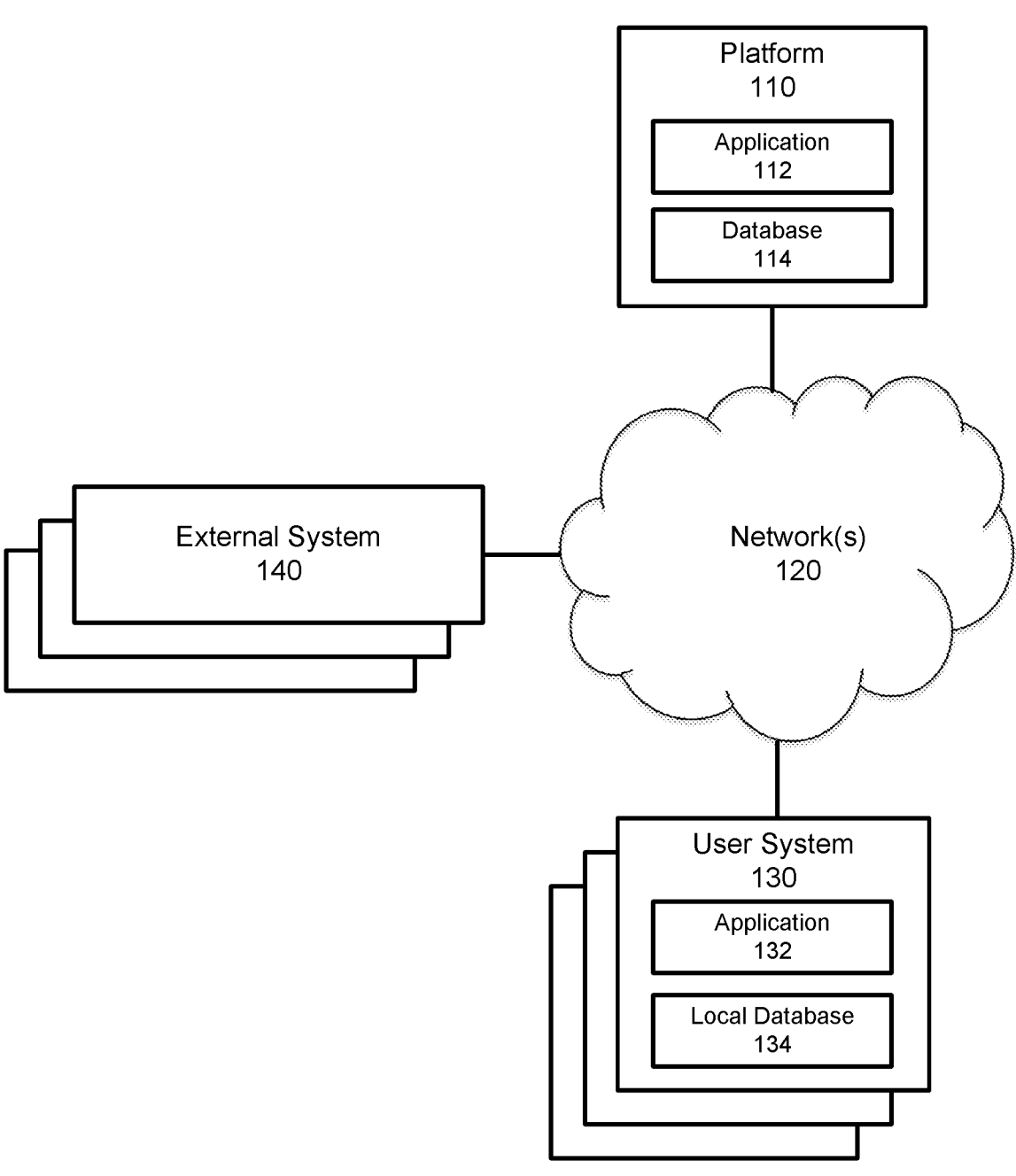
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various processes, methods, functions, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or a database 114. In addition, platform 110 may be communicatively connected to one or more user systems 130 via one or more networks 120. Platform 110 may also be communicatively connected to one or more external systems 140 (e.g., other platforms, software applications, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would typically be the personal device or professional workstation of a business development representative, administrator, or other agent of an organization engaged in sales and/or marketing of a product, such as a good or service. Each user system 130 may comprise or be communicatively connected to a client application 132 and/or a local database 134.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database 114) that are locally and/or remotely accessible to platform 110. It should be understood that platform 110 may also respond to other types of requests from user system(s) 130.

Platform 110 may comprise, be communicatively coupled with, or otherwise have access to database 114. For example, platform 110 may comprise one or more database servers which manage database 114. Server application 112 executing on platform 110 and/or client application 132 executing on user system 130 may submit data (e.g., user data, form data, etc.) to be stored in database 114, and/or request access to data stored in database 114. Any suitable database may be utilized, including without limitation MySQL™, Oracle™, IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130 and/or external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

Thus, any reference herein to a software application should be understood to refer to either a server-based application consisting of server application 112, a client-based application consisting of client application 132, or a distributed application comprising both server application 112 and client application 132. In addition, the graphical user interface, provided by such a software application, may be generated by either server application 112 or client application 132. In either case, the graphical user interface may be displayed on a display of a user system 130.

2. Example Processing System

Figure 2:
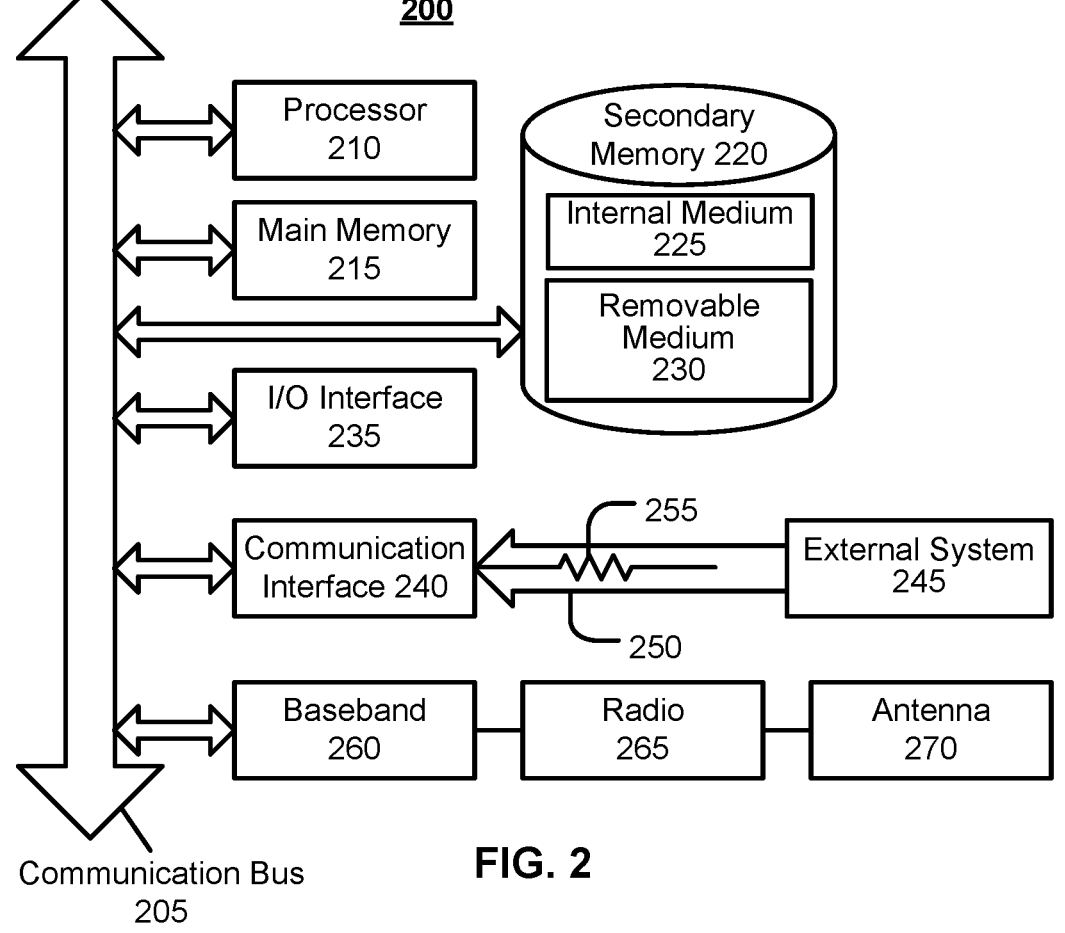
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the processes, methods, or functions (e.g., to store and/or execute the software) described herein, and may represent components of platform 110, user system(s) 130, external system(s) 140, and/or other processing devices described herein. System 200 can be any processor-enabled device (e.g., server, personal computer, etc.) that is capable of wired or wireless data communication. Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 may comprise main memory 215. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smart phone, tablet computer, or other mobile device).

System 200 may comprise a communication interface 240. Communication interface 240 allows software to be transferred between system 200 and external devices (e.g. printers), networks, or other information sources. For example, computer-executable code and/or data may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245 (e.g., which may correspond to an external system 140, an external computer-readable medium, and/or the like). In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, enable system 200 to perform the various functions of the disclosed embodiments as described elsewhere herein.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

System 200 may comprise wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is communicatively coupled with processor(s) 210, which have access to memory 215 and 220. Thus, software can be received from baseband processor 260 and stored in main memory 210 or in secondary memory 220, or executed upon receipt. Such software, when executed, can enable system 200 to perform the various functions of the disclosed embodiments.

Any of the processes described herein may be embodied in one or more software modules that are executed by processor(s) 210 of one or more processing systems 200, for example, as a service or other software application (e.g., server application 112, client application 132, and/or a distributed application comprising both server application 112 and client application 132), which may be executed wholly by processor(s) 210 of platform 110, wholly by processor(s) 210 of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component is for ease of description. Specific functions can be moved from one component to another component without departing from the disclosure.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

3. Training

Figures 3, 4:
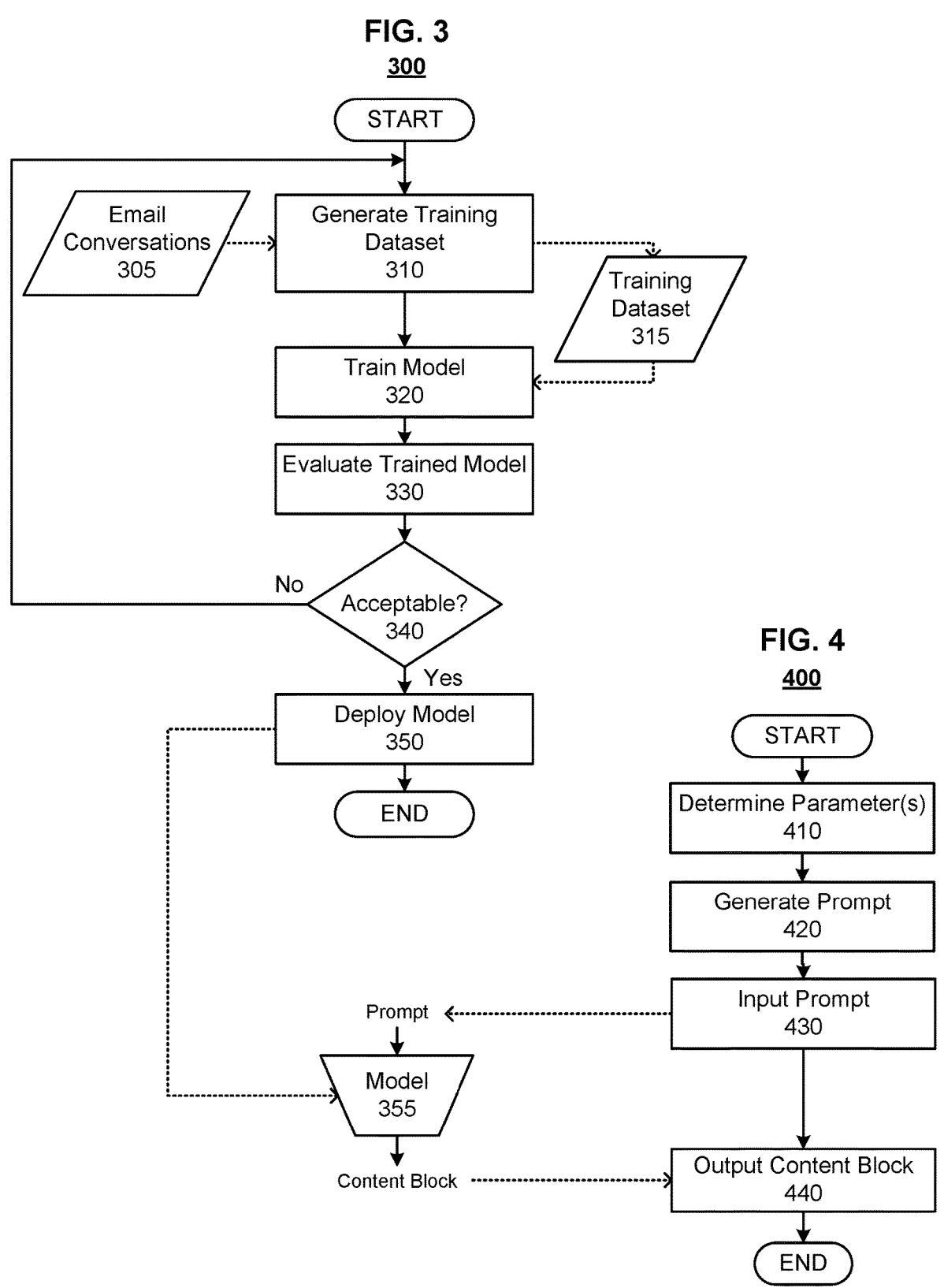
FIG. 3 illustrates a process for training a machine-learning model for automatically generating an email sequence, according to an embodiment.
FIG. 4 illustrates a process for operating a machine-learning model for automatically generating email sequences, according to an embodiment.

FIG. 3 illustrates a process 300 for training a machine-learning model 355 for automatically generating an email sequence, according to an embodiment. Process 300 may be implemented in the software application mentioned above. Process 300 may be performed under the direction of an agent (e.g., developer) of the operator of platform 110 and/or an organization utilizing platform 110, during a training stage, to produce a generative language model that can be used to generate email content in an operational stage on platform 110.

Initially, in subprocess 310, a training dataset 315 is generated from a dataset 305 of email conversations. The email conversations in dataset 305 may be derived from one or more data sources (e.g., external systems 140). These data source(s) may include a customer relationship management (CRM) system, marketing automation platform (MAP) system, and/or the like, which comprise email conversations between sales or marketing representatives from one or more organizations and contacts, representing customers and/or leads.

These email conversations may be organized into email sequences. For example, each email message may be associated with a conversation identifier and/or campaign identifier, which can be used to organize the email messages into email sequences. An email sequence may comprise any number of email messages, from one to many. An email sequence may comprise email message(s) that were sent by an organization to one or more contacts and/or email message(s) that were sent by the contact(s) to the organization.

Each email sequence may be classified into one of a plurality of classes. Each of the plurality of classes represents a different outcome of the email sequence. As one example, the plurality of classes may comprise or consist of "positive," "negative," and "unresponsive" classes. The "positive" class represents a successful outcome in the form of a positive response to the email sequence, such as an expression of interest (e.g., a reply email message that states "Yes, I am interested to find out more"), engagement, agreement, purchase, and/or the like. The "negative" class represents an unsuccessful outcome in the form of a negative response to the email sequence, such as an expression of disinterest, loss of an agreement or purchase, and/or the like. The "unresponsive" class represents an unsuccessful outcome in the form of no response to the email sequence.

The email sequences in dataset 305 may be classified manually. However, in a preferred embodiment, the email sequences in dataset 305 are classified automatically. For example, a classification model may be trained using supervised machine learning. In particular, the classification model may be trained using a training dataset comprising email sequences that are each labeled with one of the plurality of classifications (e.g., "positive," "negative," or "unresponsive"). The trained classification model may then be applied to each email sequence in dataset 305 to classify that email sequence into one of the plurality of classifications. It should be understood that, when classifying the email sequences, the feature(s) extracted from the email sequences may include feature(s) derived from replies that were sent by the contact(s), since these may be most indicative of an outcome.

In an embodiment, only email sequences associated with a successful outcome are used in training dataset 315. Using the above example, only email sequences that were classified into the "positive" class would be incorporated into training dataset 315. Email sequences associated with negative outcomes may be discarded. Again, using the above example, any email sequences that were classified into the "negative" or "unresponsive" classes would be discarded. However, in an alternative embodiment that utilizes negative reinforcement learning, email sequences associated with negative outcomes could also be included in training dataset 315. When incorporating the email sequences into training dataset 315, email messages from the contacts to the organizations may be removed, such that each email sequence consists of only email message(s) from an organization to one or more contacts.

Each email message in each email sequence to be incorporated into training dataset 315 may be sectioned into one or more content blocks. For example, different portions of an email message may be classified as one of a plurality of categories of content block. The sectioning of email messages can be done manually. For instance, human annotators may label portions of each email message as a distinct one of the categories of content block. As one example, the categories of content blocks may comprise or consist of "subject line," "illumination question," "agitation question," "main value proposition," "supporting value proposition," "succinct description," and "call to action." Each label may be verified by a plurality of human annotators before being confirmed.

Email messages are often messy and colloquial, with occasional typographical errors. To ensure that the email sequences that are generated by model 355 are free of spelling errors and grammatically correct, the content blocks may be corrected, reformatted, and/or otherwise cleaned, as needed, before training. For example, human annotators may manually clean each content block during or after labeling.

Training dataset 315 may be generated by extracting features from the content blocks. Training dataset 315 may comprise feature vectors for each category of content block. The table below illustrates an example set of feature vectors for the category of "illumination question":

| Company Name | Description Modifier | Illumination Question |
|---|---|---|
| Corp1 | Corp1 allows you to collect, transform, send, and archive your first-party customer data. | How are you collecting data across all of your tools right now? |
| Corp2 | Corp2 is the feature management platform that enables dev and ops teams to control the whole feature lifecycle, from concept to launch to value. | How are you currently controlling feature releases? |
| Corp2 | Corp2 allows you to do feature flagging, an industry best practice of wrapping a new or risky section of code or infrastructure change with a flag. | How are you currently managing your product's feature flags? |

In subprocess 320, a machine-learning model is trained using training dataset 315. The machine-learning model may be a generative language model. Subprocess 320 may start with a pretrained generative language model, such as the Generative Pre-trained Transformer (GPT). GPT-4 is the fourth-generation language prediction model in the GPT-n series, created by OpenAI™ of San Francisco, California. GPT-4 is an autoregressive language model that uses deep learning to produce human-like text. GPT-4 has been pre-trained on a vast amount of text from the open Internet. Subprocess 320 may fine-tune this pre-trained generative language model using training dataset 315. Fine-tuning improves on the few-shot learning (FSL) capabilities of GPT-4 by allowing the model to be trained on many more examples than can reasonably fit in a prompt. This enables the model to achieve better results on a wider variety of outputs. While GPT-4 is used as an example, it should be understood that the machine-learning model may be any generative language model or other generative artificial intelligence (AI) model, including past and future generations of GPT, as well as other large language models.

In a particular implementation, a GPT-3 model was configured, during training, to allow for a maximum of sixty-four tokens. This ensured that the machine-learning model generated relatively short snippets for each content block, instead of full-length email messages. In this implementation, the davinci base GPT-3 model was used. The number of epochs was set to four, the batch size was set to 0.2% of the number of examples in training dataset 315, capped at two-hundred-fifty-six, and the learning rate multiplier was set to 0.05.

In addition, a sampling temperature of 1.0 was used. Higher values of the sampling temperature result in the model taking more risks (e.g., producing more creative textual expressions), whereas lower values of the sampling temperature result in the model taking fewer risks (e.g., producing more well-defined, deterministic textual expressions). For some contexts, a higher sampling temperature may be more appropriate (e.g., "What is your favorite dessert?"), whereas for other contexts, a lower sampling temperature may be more appropriate (e.g., "What is the third planet from the Sun?"). A sampling temperature of 1.0 provides a suitable balance between the two extremes, and enables the machine-learning model to take more risks and consider tokens with lower probabilities.

In a particular implementation, a top-p nucleus sampling of 0.3 was used. This means that only the tokens comprising the top 30% of the probability mass were considered. A presence penalty of 1.0 and frequency penalty of 1.0 were used. Essentially, this penalized new tokens based on their existing frequency in the current output, which decreases the likelihood that the same completions are generated verbatim.

In subprocess 330, the model, trained in subprocess 320, may be evaluated. The result of subprocess 330 may be a performance measure for the model. Notably, a generative language model, such as GPT-3, does not lend itself to the same type of evaluation as other machine-learning models, such as a classifier. For example, standard performance measures, such as accuracy, area under the curve (AUC), precision, recall, F1 score, and the like, are generally not applicable to generative language models, since there are not always clearly wrong and clearly correct outputs. Thus, the evaluation in subprocess 330 may not necessarily be a formal evaluation, and may be as simple as a human informally testing various prompts. In an alternative embodiment, a more formal framework may be used, including a task-based test (e.g., by scoring outputs of the model in the context of email generation), a Turing-style test (e.g., by having humans interact with the model to determine whether or not the humans can distinguish the output of model 355 from human-written email messages), a truthfulness test (e.g., by determining whether or not information is being fabricated in the output of the model), a grammar test (e.g., by determining the prevalence of grammatical errors in the output of the model), a similarity test (e.g., by calculating a distance from outputs of the model to a gold-standard response), or the like. In any case, the evaluation in subprocess 330 may be performed in any suitable manner.

In subprocess 340, it is determined whether or not the model, trained in subprocess 320, is acceptable based on the evaluation performed in subprocess 330. For example, the performance measure from subprocess 330 may be compared to a threshold or one or more other criteria. If the performance measure satisfies the criteria (e.g., is greater than or equal to the threshold), the model may be determined to be acceptable (i.e., "Yes" in subprocess 340). Conversely, if the performance measure does not satisfy the criteria (e.g., is less than the threshold), the model may be determined to be unacceptable (i.e., "No" in subprocess 340). When the model is determined to be acceptable (i.e., "Yes" in subprocess 340), process 300 may proceed to subprocess 350. Otherwise, when the model is determined to be unacceptable (i.e., "No" in subprocess 340), process 300 may return to subprocess 310 to retrain the model (e.g., using a new training dataset 315, different hyperparameters, a different base model, etc.).

In subprocess 350, the trained and accepted model may be deployed as model 355. Model 355 receives a prompt and generates a textual expression in response to and in accordance with the prompt. Model 355 may be deployed by moving model 355 from a development environment to a production environment. For example, model 355 may be made available at an address on platform 110 (e.g., in a microservice architecture) that is accessible to a service or application that utilizes model 355.

Process 300 may be performed periodically to retrain model 355 based on a new dataset 305 (e.g., comprising new email conversations collected since the last iteration of process 300), feedback from users, and/or the like. In this case, a new model 355 may be deployed in subprocess 350 with a new version number. The old model 355 (i.e., deployed in a previous iteration of process 300) may be maintained with an older version number, such that it may still be applied when appropriate.

In an embodiment, each user account or organizational account may be associated with a distinct model 355. It should be understood that an organizational account may represent a particular organization and maintain one or a plurality of separate user accounts that each represent an agent of the organization. In the case that an organizational account is associated with a distinct model 355, each user account under that organizational account may have access to the model 355 associated with that organizational account.

4. Operation

FIG. 4 illustrates a process 400 for operating machine-learning model 355 for automatically generating email sequences, according to an embodiment. Process 400 may be implemented in the software application mentioned above. In particular, process 400 may be executed as a subroutine within a larger software service or application. Alternatively, process 400 may be executed as its own service (e.g., in a microservice architecture), which is accessible at a particular address to other services or applications.

Initially, in subprocess 410, process 400 determines one or more parameter values for one or more prompt parameters. These parameter value(s) may be passed as input from a calling function or service. Alternatively or additionally, these parameter value(s) may be retrieved from memory (e.g., main memory 215 and/or secondary memory 220). The parameter value(s) may be derived from user input, campaign-specific settings, account-specific settings, system-wide settings, and/or the like. Examples of prompt parameters include, without limitation, a campaign goal, a target audience, a campaign theme, a set of one or more keywords, a company name, a product name, a description, a category of content block to be generated, a template for the category of content block, a template for a prompt, and/or the like.

In an embodiment, a keyword recommendation model may be used to determine one or more parameter values in subprocess 410. An example of such a keyword recommendation model is described in U.S. Patent Publication No. US 2021/0406685 A1, which is hereby incorporated herein by reference as if set forth in full. In particular, the keyword recommendation model is trained to accept a keyword as an input and output one or more recommended keywords. Thus, for example, in subprocess 410, one or more keywords (e.g., provided by a user) may be input into the keyword recommendation model to produce a plurality of keywords that may be included in the parameter values.

In subprocess 420, process 400 generates a prompt based on the parameter value(s) determined in subprocess 410. It should be understood that a prompt is a string of characters, generally comprising or consisting of words, intended to influence the behavior of model 355 when producing an output. The prompt may comprise specific instructions, add context, provide examples, and/or the like, to guide the behavior of model 355. In an embodiment, each prompt is designed to guide model 355 to produce a single content block in a particular one of the categories of content blocks. In this manner, the prompt may be used to fine-tune the output of model 355. It should be understood that the prompts, generated in subprocess 420, may be complex. As one, non-limiting example, the template for a prompt for the category of "illumination question" may be:

"Product: Prod1
Description: Prod1 is an easy to implement, adaptable authentication and authorization platform.
Persona: Engineering Directors
Keywords: access control, auth, data breach, authentication, data protection, sso
Illumination Question: Are you currently exploring SSO implementations for your team?
- - -
Product: Prod2
Description: Prod2 allows you collect, transform, send, and archive your first-party customer data.
Persona: Product Engineers
Keywords: product analytics, privacy compliance, feature experiments, analytics api, ab testing,
Illumination Question: How are you collecting customer data from your tools right now?
- - -
. . .
- - -
Product: ProdN
Description: ProdN helps you identify active buyers so GTM teams can prioritize and build pipeline. Shorten your sales cycle and increase revenue.
Persona: Sales Managers
Keywords: contact data, mailing list, contact details, email list, contact list, lead generation, market intelligence, b2b marketing, b2b sales
Illumination Question: Do you currently use any tools to identify active buyers amongst your prospects?
- - -
Product: <company name here>
Description: <company description here>
Persona: <persona here>
Keywords: <keywords here>
Illumination Question:"
It should be understood that, in the above example of the template for a prompt, the ellipsis " . . . " represents examples that have been removed for brevity, and the placeholders defined by "< . . . >" may be replaced with one or more of the parameter values. For example, "<company name here>" may be replaced with the company or product name in the prompt parameters, "<company description here>" may be replaced with the description in the prompt parameters, "<persona here>" may be replaced with the target audience in the prompt parameters, and "<keywords here>" may be replaced with the keywords in the prompt parameters. Notably, the example template will produce a prompt that provides a series of one or more examples of an ideal output (e.g., a content block representing an illumination question in this example) in association with a product name, a description, a target audience, and one or more keywords, and then prompt model 355 to provide the missing output (e.g., the illumination question in this example) for a new set of product name, description, target audience, and keyword(s). More generally, the prompt may comprise one or more examples, which each comprises an output (i.e., an example content block in a particular one of the categories of content blocks) in association with one or more example values for one or more prompt parameters, and a prompt to provide the output (i.e., the content block in the same particular category of content blocks) for the parameter value(s) (e.g., as determined in subprocess 410) for the same one or more prompt parameters that are used in the example(s).

In subprocess 430, the prompt, generated in subprocess 420, is input to model 355. As described elsewhere herein, model 355 may be a generative language model, such as GPT-3, which outputs a response to the prompt. In an embodiment, the response from model 355 represents a content block of an email message.

In subprocess 440, process 400 outputs the content block, generated by model 355. The content block may be returned to a calling function or service. Alternatively or additionally, the content block may be written to memory (e.g., main memory 215 and/or secondary memory 220).

In summary, each iteration of process 400 may prompt model 355 to produce a content block. Over multiple iterations of process 400, a plurality of content blocks may be generated. These content blocks may be incorporated into one or more email messages of an email sequence, that can be used in an email campaign for marketing a product.

5. Example Application

FIG. 5 illustrates a process 500 for generating an email sequence using a machine-learning model, according to an embodiment. Process 500 may be implemented in the software application mentioned above. In particular, process 500 may be executed as a subroutine within a larger software service or application. Alternatively, process 500 may be executed as its own service (e.g., in a microservice architecture), which is accessible at a particular address to other services or applications.

Initially, in subprocess 505, process 500 receives one or more parameter values for one or more parameters. These parameter value(s) may be passed as input from a calling function or service. Alternatively or additionally, these parameter value(s) may be retrieved from memory (e.g., main memory 215 and/or secondary memory 220). The parameter value(s) may be derived from user input, campaign-specific settings, account-specific settings, system-wide settings, and/or the like. However, it is generally contemplated that there will be a plurality of parameters, and at least a subset of the parameter values for these parameters will be received from user input via a graphical user interface. Examples of parameters include, without limitation, a campaign goal, a target audience, a campaign theme, a company name, a product name, a description, a template for an email message, a template for an email sequence, and/or the like.

In subprocess 510, process 500 determines whether or not another email message is to be generated for the current email sequence being generated. The number and type of email messages to be generated may be determined by the parameter values, received in subprocess 505. For example, the parameters may comprise a template for an email sequence that defines the number and type of email messages to be generated. A typical email sequence may comprise a first (e.g., introductory) email message and one or more follow-up email messages. When another email message is to be generated for the email sequence (i.e., "Yes" in subprocess 510), process 500 proceeds to subprocess 515. Otherwise, when the email sequence is complete (i.e., "No" in subprocess 510), process 500 proceeds to subprocess 530.

In subprocess 515, process 500 determines whether or not another content block is to be generated for the current email message. The content blocks to be generated for the current email message may be determined by the parameter values, received in subprocess 505. For example, the parameters may comprise a template for an email message that defines the position of one or more content blocks within the email message and the category of each of those content block(s). The template for an email message may also define fixed text and/or placeholders at one or more fixed positions, as discussed elsewhere herein, to be used in combination with the content block(s).

When another content block is to be generated for the current email message (i.e., "Yes" in subprocess 515), process 500 performs an iteration of process 400 and adds the content block, output by process 400, to the current email message in subprocess 520. When performing an iteration of process 400, process 500 may pass a set of one or more parameters values to process 400, such as the category of content block to be generated, company and/or product name, one or more keywords, target audience, description, and/or the like. At least some, if not all, of these parameter values may be derived from the parameter values received in subprocess 505, and may correspond to the parameter values determined in subprocess 410. The generated content block may be added to the position in the current email message that is defined by the template of the email message being generated. In an embodiment, each content block is generated independently from other content blocks in the email sequence. On the other hand, when the current email message is complete (i.e., "No" in subprocess 515), process 500 adds, in subprocess 525, the complete email message to the current email sequence being generated, and returns to subprocess 510.

In subprocess 530, process 500 outputs the complete email sequence that was generated. For example, the complete email sequence may be displayed within the graphical user interface of the software application. While it is generally contemplated that the email sequence will comprise a plurality of email messages, such as a first email message and one or more follow-up email messages, the email sequence could consist of only a single email message or could comprise a different sequence of email messages.

In subprocess 535, process 500 determines whether or not any parameters have been updated. For example, a user may change one or more of the parameter values and/or input new parameter values via a graphical user interface. When at least one parameter has been updated (i.e., "Yes" in subprocess 535), process 500 may return to subprocess 505. In this manner, a user can adjust the parameters, as desired, until the user is satisfied with the email sequence that is output in subprocess 530. Otherwise, when no parameters are updated (i.e., "No" in subprocess 535), process 500 may proceed to subprocess 540.

In subprocess 540, process 500 determines whether or not to regenerate one of the content blocks in one of the email messages in the email sequence that was output in subprocess 530. For example, a user may select an input, associated with a particular content block, within the graphical user interface of the software application, to regenerate that content block. When a content block is to be regenerated (i.e., "Yes" in subprocess 540), process 500 performs an iteration of process 400 for that content block, updates the content block with the output of process 400 in subprocess 545, and returns to subprocess 530 to output the email sequence with the updated content block. In this case, the content block is regenerated using the same parameter values as before, but will likely be different than the prior content block due to randomness in model 355, especially when model 355 is configured with a high sampling temperature. A user may utilize this regeneration option whenever the user would like to see alternative outputs of model 355 for a given content block, using the same parameter values. On the other hand, when no content block is to be regenerated (i.e., "No" in subprocess 540), process 500 proceeds to subprocess 550.

In subprocess 550, process 500 determines whether or not to save the email sequence that was output in the most recent iteration of subprocess 530. For example, the user may select an input, in the graphical user interface, for saving the email sequence, and process 500 may save the email sequence in response to the user's selection of the input. When determining to save the email sequence (i.e., "Yes" in subprocess 550), process 500 proceeds to subprocess 555. Otherwise, when not determining to save the email sequence (i.e., "No" in subprocess 550), process 500 returns to subprocess 535 and continues to wait.

In subprocess 555, process 500 saves the email sequence, output in the most recent iteration of subprocess 530, in memory (e.g., main memory 215 and/or secondary memory 220). For example, the email sequence may be saved into a playbook of email campaigns associated with a user account of the current user or an organizational account of the organization with which the current user is associated.

Once saved, the email sequence may be utilized to initiate an email campaign. For example, at a future time, the user could associate the email sequence with a plurality of contacts via the graphical user interface of the software application. At the start of the email campaign, the software application may generate a contact-specific instance of the first email message in the email sequence for each of the plurality of contacts. In doing so, the software application may utilize contact-specific information from a contact database (e.g., within database 114 and/or local database 134). For example, one or more email messages in the email sequence may have placeholders for contact-specific information, such as the contact's email address, first name, last name, company name, and/or the like. For each of the plurality of contacts, the software application may retrieve the contact-specific information for that contact from the contact database, and create the contact-specific instance of the first email message by replacing any placeholders in the first email message with the corresponding contact-specific information. In other words, the software application may merge contact information with the first email message in the email sequence to generate a contact-specific email message for each contact associated with the email campaign.

The software application may then send these contact-specific instances of the first email message from the user's email account or an organizational email account to the plurality of contacts. The software application may communicate with a Simple Mail Transfer Protocol (SMTP) server or other server to send each of the contact-specific email messages.

After sending the contact-specific instances of the first email message, a follow-up process may be initiated for each of the plurality of contacts. The follow-up process may monitor replies to the first email messages. For any of contacts that do not reply to the first email message within a predefined period of time (e.g., as set by parameter value(s) received in subprocess 505), the follow-up process may generate contact-specific instances of the second email message in the email sequence, and send those contact-specific instances of the second email message to their respective contacts, in the same manner as described above with respect to the first email message. The follow-up process may continue to do this for any additional follow-up email messages in the email sequence, until either all contacts have responded or no more email messages remain in the email sequence.

6. Example Graphical User Interface

FIGS. 6A and 6B illustrate an example of a graphical user interface 600 that can be utilized with process 500 to generate email sequences, according to an embodiment. Graphical user interface 600 may be generated by the software application described herein.

As illustrated in FIG. 6A, graphical user interface 600 may at least initially comprise a first frame 610 and a second frame 620. First frame 610 enables a parameter value for each of one or more parameters to be input by the user, which corresponds to subprocesses 505 and/or 535. Second frame 620 displays the email sequence after the email sequence has been generated or regenerated, which corresponds to subprocess 530.

The user may input the parameter value(s) into first frame 610. For example, first frame 610 may comprise an input 611 for specifying a goal of the email sequence to be generated, an input 612 for specifying a target audience for the email sequence to be generated, an input 613 for specifying one or more themes (e.g., up to a predefined number of themes, such as three) for the email sequence to be generated, an input 614 for identifying a name or short description of the email sequence to be generated, an input 615 for specifying a name of the company or product to be marketed via the email sequence to be generated, an input 616 for specifying a description of the company or product to be marketed via the email sequence to be generated, and an input 617 for initiating generation of the email sequence. At least a subset of these parameters, and potentially all of these parameters, may be mandatory (e.g., input 617 may be grayed out or otherwise un-selectable until parameter values have been input for all mandatory parameters). Alternatively, at least a subset, and potentially all of these parameters, may be non-mandatory and input at the user's discretion.

When a user selects input 617, an email sequence may be automatically generated from the parameter values provided in first frame 610. It should be understood that selection of input 617, which submits these parameter values to process 500, corresponds to subprocess 505, and that the parameter values in first frame 610, at the time that input 617 is selected, may represent at least a subset of the parameter value(s) received in subprocess 505. In response to the selection of input 617, an email sequence is generated according to subprocesses 510-525. In an alternative embodiment, second frame 620 may be updated in real time as the user inputs parameter value(s) into first frame 610. As used herein, the term "real time" encompasses both events that occur simultaneously and events that are separated in time due to ordinary delays caused by latencies in processing, communications, memory access, and/or the like.

The generated email sequence is displayed in second frame 620. The presentation of the generated email sequence in second frame 620 is one possible implementation of subprocess 530. Second frame 620 comprises each email message 622 in the generated email sequence. In the illustrated example, there is a first email message 622A, a first follow-up email message 622B, and a second follow-up email message 622C. It should be understood that there may be additional follow-up email messages, or the email sequence may have a different structure than illustrated (e.g., different types of email messages 622, different relationships between email messages 622, etc.). Each email message 622 may share the same subject line. Thus, the subject line may only be shown once (e.g., as part of first email message 622A).

In addition, second frame 620 may comprise a legend for all of the different categories of content blocks. For example, the legend may comprise indicator 624A representing "subject line," indicator 624B representing "illumination question," indicator 624C representing "agitation question," indicator 624D representing "main value proposition," indicator 624E representing "supporting value proposition," indicator 624F representing "succinct description," and indicator 624G representing "call to action." It should be understood that these are simply examples of the categories of content blocks, and that fewer, more, or different categories are possible. Each indicator 624 may be color-coded (i.e., have a different color than any of the other indicators 624 or one or more of the other indicators 624).

Each email message 622 may comprise fixed text. The fixed text may be derived from a template of an email message or email sequence. Additionally or alternatively, one or more email messages 622 may comprise one or more content blocks 626 and/or placeholders 628. It should be understood that the fixed text will be identical across different email sequences generated from the same template. In addition, the positions of content blocks 626 and placeholders 628 will be identical across different email sequences generated from the same template. However, the actual textual content with content blocks 626 and placeholders 628 may, and generally will, differ across different email sequences generated from the same template.

Each content block 626 represents an output of model 355 for a particular category of content block. Each content block 626 may be color-coded according to the same color-coding as the indicator 624 that corresponds to the same category. For example, content block 626A, which is for the "subject line" category, may be highlighted in the same color (e.g., pastel red) as indicator 624A, content block 626B, which is for the "illumination question" category, may be highlighted in the same color (e.g., pastel teal) as indicator 624B, content block 626C, which is for the "agitation question" category, may be highlighted in the same color (e.g., pastel green) as indicator 624C, content block 626D, which is for the "main value proposition" category, may be highlighted in the same color (e.g., pastel purple) as indicator 624D, content block 626E, which is for the "supporting value proposition" category, may be highlighted in the same color (e.g., pastel purple) as indicator 624E, content block 626F, which is for the "succinct description" category, may be highlighted in the same color (e.g., pastel blue) as indicator 624F, and content block 626G, which is for the "call to action" category, may be highlighted in the same color (e.g., pastel orange) as indicator 624G. In an embodiment, indicators 624 are selectable, such that when a user selects a particular indicator 624, any content blocks 626, associated with the category represented by the selected indicator 624, are distinguished (e.g., darkened, boldened, etc.) from all other content blocks 626 not associated with the category represented by the selected indicator 624.

A placeholder 628 is a portion of the template that is set directly to the value of some variable. At least some of these variable values may be derived from contact information when contact-specific instances of the email messages are generated. For example, for each contact associated with an email campaign, the contact's first name may be filled into placeholder 628A, which represents a greeting, when an instance of an email message is generated for that contact. Additionally or alternatively, at least some of these variable values may be derived from parameter values. For example, the value of placeholder 628B is derived directly from the value of the target audience (e.g., specified in input 612), and the value of placeholder 628C is derived directly from the value of the product name (e.g., specified in input 615).

In an embodiment, each content block 626 in second frame 620 is selectable and may be independently regenerated (i.e., without altering any other portion of the current email sequence). For example, FIG. 6B illustrates graphical user interface 600 after a user has selected content block 626F, corresponding to the category of content block represented by indicator 624F (i.e., "succinct description" in this example). In response to the selection of content block 626F, a dialog box 640 appears near content block 626F. Dialog box 640 comprises an input 642 for generating suggestions, an input 644 for flagging the current textual content in content block 626F as incorrect, and/or an input 646 for flagging the current textual content in content block 626F as offensive.

In FIG. 6B, it has been assumed that the user has selected input 642, which corresponds to "Yes" in subprocess 540). In response to the selection of input 642, first frame 610 has been replaced with third frame 630. Third frame 630 comprises one or more new suggestions 632 of textual content for the currently selected content block 626F. Initially, a predefined number (e.g., three) of new suggestions 632 may be displayed. For example, new suggestions 632A, 632B, and 632C are initially displayed. However, the user may generate further new suggestions by selecting input 634.

Each new suggestion 632 is selectable. The user may select any of the new suggestions 632 in third frame 630 to replace the current textual content in content block 626F with the textual content in the new suggestion. This replacement corresponds to the update in subprocess 545. For example, if the user selected new suggestion 632B, the current textual content in content block 626F would be swapped out for the textual content in new suggestion 632B.

If the user selects input 644 or 646, the current textual content in content block 626F may be recorded in association with an indicator of its incorrectness or offensiveness, respectively. This record may be used as feedback to retrain or fine-tune model 355. For example, this information could be used in a training dataset that is used to retrain or fine-tune model 355.

When the user deselects a content block 626 or selects one of new suggestions 632 in third frame 630, third frame 630 may be replaced with first frame 610. It should be understood that the user may update the information in first frame 610 at any time and reselect input 617 to regenerate the entire email sequence. The initiation of this regeneration corresponds to "Yes" in subprocess 535.

Once the user is satisfied with the email sequence in second frame 620, the user may save the email sequence to a playbook or other data structure associated with the user's user account. For example, the user may select a save input (not shown) to save the email sequence. In response to selection of the save input, the email sequence may be saved to the playbook, for example, under the name specified in input 614. Saving of the email sequence corresponds to subprocess 555.

The playbook may comprise a set of one or more email sequences that can be used to launch an email campaign, perform multi-variate testing or other experimentation, and/or the like. The user may view the playbook associated with the user's user account at any time in the graphical user interface of the software application. The playbook may be displayed as a list comprising, for each email sequence, an identifier of the email sequence, a name of the email sequence (e.g., as specified in input 614 when the email sequence was saved), a touch point order, a representation of the body of the email sequence (e.g., a starting snippet from the email sequence), a date and time that the email sequence was created, a date and time at which the email sequence was most recently updated, an input for deleting the email sequence, an input for editing the email sequence that when selected returns the user to graphical user interface 600, and/or the like. Each email sequence in the playbook may be selectable. When a user selects a particular email sequence in the playbook, the user may be provided with one or more screens for specifying parameter values of an email campaign (e.g., selecting contacts to be associated with the email campaign) and launching the email campaign (e.g., by sending the first email message in the email sequence and initiating a follow-up process, as described elsewhere herein).

7. Example of Automated Email Reply

FIG. 7 illustrates a process 700 for generating an email reply using a machine-learning model, according to an embodiment. Process 700 may be implemented in the software application mentioned above. In particular, process 700 may be executed as a subroutine within a larger software service or application. Alternatively, process 700 may be executed as its own service (e.g., in a microservice architecture), which is accessible at a particular address to other services or applications.

Initially, in subprocess 710, an email message is received. For example, the email message may be received by a Simple Mail Transfer Protocol (SMTP) server or other mail server on platform 110. Alternatively, the email message may be uploaded to platform 110 by user system 130 or an external system 140, input to platform 110 by a user (e.g., copied into a graphical user interface of server application 112), or the like. It is generally contemplated that the email message would be received from a customer of an organization with an organizational account on platform 110. However, the email message may be from any sender (e.g., whether or not a customer) to any recipient (e.g., whether or not the organization with the organizational account).

In subprocess 720, the intent of the email message is classified by a plurality of different models. Each of the plurality of models may be an intent classification model. Each intent classification model is applied to the email message to classify the intent of the customer who sent the email message by analyzing the language used in the email message. In particular, the intent classification model will classify the email message into one of a plurality of possible intent classifications. Each of the plurality of possible intent classifications represents a different intent. One of the plurality of possible intent classifications may also be a catch-all classification that represents that the email message could not be classified into any of the other possible intent classifications.

An intent classification model may comprise the Light Gradient Boosting Machine (LightGBM) classifier, the Robustly Optimized Bidirectional Encoder Representations from Transformers Pretraining Approach (RoBERTa) classifier, or any other suitable classifier. The LightGBM classifier is based on decision-tree algorithms, and is described in "LightGBM: A Highly Efficient Gradient Boosting Decision Tree," by G. Ke et al., 31st Conference on Neural Information Technology Processing Systems (NIPS 2017), which is hereby incorporated herein by reference as if set forth in full. The RoBERTa classifier is a deep-learning artificial neural network, based on the well-known Bidirectional Encoder Representations from Transformers (BERT) natural-language-processing (NLP) model, and is described in "RoBERTa: A Robustly Optimized BERT Pretraining Approach," by Y. Liu et al., arXiv: 1907.11692, which is hereby incorporated herein by reference as if set forth in full. It should be understood that these are just two examples. An intent classification model may comprise other decision-tree algorithms, other artificial neural networks, including deep-learning artificial neural networks, such as the BERT classifier or other BERT-based classifiers, other NLP models, or the like.

The plurality of intent classification models used in subprocess 720 may all be the same type of model. However, in an embodiment, at least one of the plurality of intent classification models is of a different type than another one of the plurality of intent classification models. For example, a first one of the plurality of intent classification models may be a LightGBM classifier, and a second one of the plurality of intent classification models may be a RoBERTa classifier. This provides a more diverse and robust determination of intent.

Each intent classification model may also output a confidence value associated with its intent classification. In other words, each intent classification model will receive the email message as an input, and will output an intent classification, representing the customer's intent in sending the email message, and a confidence value, representing the confidence or probability that the output classification is correct. For ease of understanding, the classification output by an intent classification model may also be referred to herein as the "intent" of the email message.

One or more, including potentially all, of the intent classification models may be trained using supervised learning. For example, a training dataset may be generated from historical email messages (e.g., from customers). The training dataset may comprise, for each of a plurality of historical email messages, a record comprising one or more features extracted from the historical email message, labeled with an intent classification, from the plurality of possible intent classifications, representing the ground-truth intent classification. The records may be labeled with the ground-truth intent classifications manually (e.g., by a panel of experts) or in any other suitable manner. An intent classification model may be trained by, for each of record in the training dataset, minimizing a loss function that calculates an error between the intent classification output by intent classification model being trained, given the feature(s) in the record, and the ground-truth intent classification for that record. The same training dataset may be used for each of the plurality of intent classification models, or one or more of the plurality of intent classification models may be trained using a different training dataset than one or more other ones of the plurality of intent classification models.

It should be understood that the feature(s) that are used to train an intent classification model will be the same feature(s) that will be extracted from email messages when applying or operating that intent classification model in subprocess 720. In addition, different intent classification models and/or different types of intent classification models may utilize different features. For example, the LightGBM classifier may utilize a different set of features than the RoBERTa classifier. Alternatively, all of the intent classification models may utilize the same features.

In subprocess 730, it is determined whether or not all or some predefined percentage of the intents (i.e., intent classifications), output by the plurality of intent classification models in subprocess 720, match. Each of the intent classification models may classify the email message into one of the same set of possible intent classifications, or the sets of possible intent classifications associated with each intent classification model may be mapped to each other, so that the correspondences between the sets of possible intent classifications of different intent classification models can be easily determined. In either case, two intent classifications or intents will match if they represent the same intent. Conversely, two intent classifications or intents will not match when they represent different intents. When the intents match (i.e., "Yes" in subprocess 730), process 700 proceeds to subprocess 740. Otherwise, when the intents do not match (i.e., "No" in subprocess 730), process 700 proceeds to subprocess 790.

In subprocess 740, it is determined whether or not the confidence of the intents, which were determined to match in subprocess 730, satisfies (e.g., greater than, greater than or equal to, etc.) a predefined threshold. In this case, it may be determined whether the confidence value of each intent individually satisfies a predefined threshold. Alternatively, the confidence value of each intent may be combined into a composite confidence value, and it may be determined whether the composite confidence value satisfies a predefined threshold. The composite confidence value may be calculated by averaging the confidence values for each intent. The average may be a straight average, or a weighted average in which the confidence value output by one of the plurality of intent classification models is weighted higher than the confidence value output by another one of the plurality of intent classification models (e.g., based on known accuracy, performance, and/or the like). When the confidence satisfies the threshold (i.e., "Yes" in subprocess 740), process 700 proceeds to subprocess 750. Otherwise, when the confidence does not satisfy the threshold (i.e., "No" in subprocess 740), process 700 proceeds to subprocess 790.

In subprocess 750, one or more content blocks required to construct a reply email message are determined. For example, each intent classification, as determined in subprocess 720 and matched in subprocess 730, may be associated with a template. This template may be derived from an email sequence (e.g., generated by process 500) that is associated with the intent, or in any other suitable manner. The template may define a layout, including the position of one or more content blocks to be filled in. In this case, it should be understood that the content block(s) defined in the template are the content block(s) determined in subprocess 750.

Subprocesses 760-770 will iterate through each of the one or more content blocks determined in subprocess 750. When another content block remains to be generated (i.e., "Yes" in subprocess 760), process 700 performs an iteration of process 400 and adds the content block, output by process 400, to the reply email message. When performing an iteration of process 400, process 700 may pass a set of one or more parameters values to process 400, such as the category of content block to be generated, company and/or product name, one or more keywords, target audience, description, and/or the like. The generated content block may be added to the position in the reply email message that is defined by the template of the reply email message being generated. In an embodiment, each content block is generated independently from other content blocks in the reply email message. On the other hand, when no more content blocks remain to be generated (i.e., "No" in subprocess 760), process 700 proceeds to subprocess 780.

In subprocess 780, after all of the content block(s) have been generated and added, the reply email message may be generated. In an embodiment, the reply email message may be automatically sent without requiring any user intervention. In an alternative embodiment, the reply email message may be notified to a user for confirmation, and upon receiving the user's confirmation, the reply email message may be sent. In yet another alternative embodiment, the reply email message may be placed in a "drafts" folder of an email client, or otherwise provided to a user, for the user to manually send the reply email message via an email client.

In an embodiment, one of the plurality of possible intent classifications may be a meeting. An email message that is classified with the meeting intent indicates that the sender of the email message (e.g., a customer) desires a meeting with an agent of the organization to which the email message was sent. In this case, the reply email message, generated in subprocess 780, may include the email address of that agent as the sender or as a "to" or carbon-copy (cc) recipient of the reply email message. Alternatively or additionally, subprocess 780 may automatically access scheduling software used by the agent to determine an available time for the agent, generate a meeting invite, and attach the meeting invite to the reply email message or incorporate the reply email message into the meeting invite.

In an embodiment, one of the plurality of possible intent classifications may be information. An email message that is classified with the information intent indicates that the sender of the email message (e.g., a customer) desires information about a product (e.g., good or service). In this case, the reply email message, generated in subprocess 780, may include a document containing the desired information or a reference to the desired information. The document may be a product brochure for the product, a whitepaper about the product, or the like. The reference may be a hyperlink to a website related to the product. Subprocess 780 may automatically retrieve and append the document to the reply email message and/or incorporate the reference into the reply email message.

In subprocess 790, a user is notified about the email message received in subprocess 710. Process 700 reaches subprocess 790 when either the plurality of intent classification models did not agree on the intent classification or the confidence did not satisfy the threshold. In this case, process 700 is not sufficiently confident to automatically generate the reply email message. Accordingly, a user is notified to either specify the correct intent classification, so that the reply email message may be automatically generated (e.g., via subprocesses 750-780) or to manually write the reply email message or the content blocks of the reply email message (e.g., by filling in a template for the reply email message).

In an embodiment of subprocess 790 in which the user is prompted to specify the correct intent, subprocess 790 may comprise, via the graphical user interface, providing the user with the email message, received in subprocess 710, and a list of selectable representations of each possible intent classification. The graphical user interface may also indicate the intent classifications that each of the intent classification models output. The user may select the correct intent classification from the list in the graphical user interface, and process 700 may responsively proceed to subprocess 750 using the user-specified intent classification. At this point, it should be understood that the user-specified intent classification will be used to determine the content block(s) in subprocess 750, and the reply email message may be automatically generated in subprocesses 760-780.

In an additional or alternative embodiment of subprocess 790, a plurality of different users may be prompted to specify the correct intent classification. For example, the plurality of users may be a panel of three or more users with experience in intent classification. In this case, subprocess 790 may comprise, via the graphical user interface, providing each user in the panel with the email message, received in subprocess 710, and a list of selectable representations of each possible intent classification. Each user may select the intent classification that they believe corresponds to the email message. If the entire panel selects the same intent classification, the selected intent classification becomes the final user-specified intent classification. Otherwise, if the panel disagrees on the intent classification, a selection mechanism may be used to select the final user-specified intent classification. The selection mechanism may comprise selecting the intent classification with the majority of votes, selecting the intent classification using a weighted consensus based on the experience, accuracy, or other attributes of each user on the panel (e.g., some users get more votes than other users), adding one or more users to the panel, repaneling a new panel of users, and/or the like. In any case, the final user-specified intent and the email message, received in subprocess 710, may be used to retrain one or more, including potentially all, of the intent classification models used in subprocess 720. For example, one or more features of the email message may be extracted and labeled with the final user-specified intent as the ground-truth intent classification, to produce a new record that can be added to a new training dataset. Immediately, periodically, whenever a sufficient number of new records have been produced, and/or based on any other trigger, the intent classification model(s) may be retrained with the new training dataset, which may include all of the new records accumulated since the last retraining. In this manner, the intent classification model(s) can be continually fine-tuned on the data samples with which it is the least confident, thereby improving the overall accuracy of the intent classification model(s).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive one or more parameter values for one or more parameters;
   generate an email sequence by, for each of one or more email messages in the email sequence, for each of one or more content blocks in the email message,
      generating a prompt based on the one or more parameter values, wherein the prompt comprises
         one or more examples of the content block, wherein each of the one or more examples comprises an ideal output in association with an example value for at least one prompt parameter, and
         an indication to provide an output based on a value, for the at least one prompt parameter, that is specific to the content block,
      inputting the prompt to a generative language model to produce the content block, and
      adding the content block to the email message; and
   output the generated email sequence.

2. The method of claim 1, wherein the one or more email messages are a plurality of email messages.

3. The method of claim 2, wherein the email sequence comprises a first email message and one or more follow-up email messages.

4. The method of claim 1, further comprising training the generative language model by fine-tuning a pretrained generative language model.

5. The method of claim 4, wherein the fine-tuning is performed using a training dataset that is derived from email conversations that have been classified according to outcome.

6. The method of claim 1, wherein each of the one or more content blocks is associated with one of a plurality of categories of content blocks.

7. The method of claim 6, wherein the plurality of categories comprises one or more of a subject line, an illumination question, an agitation question, a main value proposition, a supporting value proposition, a succinct description, or a call to action.

8. The method of claim 1, wherein the at least one prompt parameter comprises one or more of a company or product name, a set of one or more keywords, a company or product description, or a target audience.

9. The method of claim 1, wherein the at least one prompt parameter comprises a set of one or more keywords that are derived from the one or more parameter values.

10. The method of claim 1, further comprising using the at least one hardware processor to generate a graphical user interface comprising one or more inputs, wherein receiving the one or more parameter values comprises receiving an input of the one or more parameter values via the one or more inputs of the graphical user interface.

11. The method of claim 10, wherein the one or more inputs are a plurality of inputs, and wherein the method further comprises using the at least one hardware processor to receive a selection of one of the plurality of inputs, wherein the email sequence is generated in response to the selection of the one input.

12. The method of claim 10, wherein outputting the generated email sequence comprises updating the graphical user interface to display the generated email sequence.

13. The method of claim 12, wherein each of the one or more content blocks in the displayed email sequence is selectable, and wherein the method further comprises using the at least one hardware processor to:
   when receiving a selection of one of the one or more content blocks in the displayed email sequence, display an input for regenerating the selected content block; and
   in response to a selection of the input for regenerating the selected content block, re-input the prompt, generated for the selected content block, to the generative language model to produce one or more new suggestions for the selected content block.

14. The method of claim 13, wherein each of the one or more new suggestions for the selected content block is selectable, and wherein the method further comprises using the at least one hardware processor to, in response to a selection of one of the one or more new suggestions, replace textual content in the selected content block in the displayed email sequence with the textual content in the selected new suggestion.

15. The method of claim 1, further comprising using the at least one hardware processor to:
   receive an update to at least one of the one or more parameter values;
   regenerate the email sequence by, for each of the one or more email messages in the email sequence, for each of the one or more content blocks in the email message,
      generating the prompt based on the one or more parameter values including the updated at least one parameter value,
      inputting the prompt to the generative language model to produce the content block, and
      adding the content block to the email message; and
   output the regenerated email sequence.

16. The method of claim 1, wherein the one or more parameters comprise one or more of a goal of the email sequence, a target audience for the email sequence, a theme of the email sequence, a name of a company or product, or a description of the company or product.

17. The method of claim 1, further comprising using the at least one hardware processor to:

save the generated email sequence in memory;

associate a plurality of contacts with the saved email sequence; and initiate an email campaign by merging contact information, associated with the plurality of contacts, with a first email message in the email sequence to generate a plurality of contact-specific email messages to the plurality of contacts, and send each of the plurality of contact-specific email messages to a respective one of the plurality of contacts.

18. A system comprising:

at least one hardware processor; and one or more software modules that are configured to, when executed by the at least one hardware processor, receive one or more parameter values for one or more parameters;

generate an email sequence by, for each of one or more email messages in the email sequence, for each of one or more content blocks in the email message, generating a prompt based on the one or more parameter values, wherein the prompt comprises one or more examples of the content block, wherein each of the one or more examples comprises an ideal output in association with an example value for at least one prompt parameter, and an indication to provide an output based on a value, for the at least one prompt parameter, that is specific to the content block, inputting the prompt to a generative language model to produce the content block, and adding the content block to the email message; and output the generated email sequence.

19. A non-transitory computer-readable medium having instructions stored therein, wherein the instructions, when executed by a processor, cause the processor to:

receive one or more parameter values for one or more parameters;

generate an email sequence by, for each of one or more email messages in the email sequence, for each of one or more content blocks in the email message, generating a prompt based on the one or more parameter values, wherein the prompt comprises one or more examples of the content block, wherein each of the one or more examples comprises an ideal output in association with an example value for at least one prompt parameter, and an indication to provide an output based on a value, for the at least one prompt parameter, that is specific to the content block, inputting the prompt to a generative language model to produce the content block, and adding the content block to the email message; and output the generated email sequence.

20. A method comprising using at least one hardware processor to:

receive an email message;

apply a plurality of intent classification models to the email message, wherein each of the plurality of intent classification models outputs an intent classification of the email message and a confidence value;

when the intent classifications, output by the plurality of intent classification models, match each other, and a confidence, represented by the confidence values output by the plurality of classification models, satisfies a threshold, generate a reply email message by, determining one or more content blocks based on the matching intent classifications, for each of the one or more content blocks, generating a prompt based on one or more parameter values, wherein the prompt comprises one or more examples of the content block, wherein each of the one or more examples comprises an ideal output in association with an example value for at least one prompt parameter, and an indication to provide an output based on a value, for the at least one prompt parameter, that is specific to the content block, inputting the prompt to a generative language model to produce the content block, and adding the content block to the reply email message, and outputting the reply email message; and, when the intent classifications do not match each other or the confidence does not satisfy the threshold, notify a user.

21. The method of claim 20, wherein the plurality of intent classification models comprises different types of models.

22. The method of claim 20, wherein the plurality of intent classification models comprises one or both of a light gradient boosting machine (LightGBM) classifier, or a bidirectional encoder representations from transformers (BERT)-based classifier.

23. The method of claim 20, wherein outputting the reply email message comprises automatically sending the reply email message without human intervention.

24. The method of claim 20, wherein generating the reply email message further comprises, when the intent classifications indicate that a sender of the email message desires a meeting with an agent, adding an email address of the agent to the reply email message.

25. The method of claim 20, wherein generating the reply email message further comprises, when the intent classifications indicate that a sender of the email message desires information about a product, adding a document, containing information about the product, or a reference to information about the product to the reply email message.

* * * * *